United States Patent
Welle et al.

(10) Patent No.: US 7,639,177 B2
(45) Date of Patent: Dec. 29, 2009

(54) METHOD AND DEVICE FOR CORRECTING NON-IDEAL INTERMEDIATE-FREQUENCY SIGNALS IN DISTANCE SENSING DEVICE ACCORDING TO THE FMCW PRINCIPLE

(75) Inventors: Roland Welle, Wolfach (DE); Karl Griessbaum, Muehlenbach (DE); Josef Fehrenbach, Haslach (DE)

(73) Assignee: Vega Grieshaber KG, Wolfach (DE)

( * ) Notice: Subject to any disclaimer, the term of this patent is extended or adjusted under 35 U.S.C. 154(b) by 12 days.

(21) Appl. No.: 11/942,266

(22) Filed: Nov. 19, 2007

(65) Prior Publication Data

US 2008/0143583 A1 Jun. 19, 2008

Related U.S. Application Data

(60) Provisional application No. 60/874,986, filed on Dec. 13, 2006.

(30) Foreign Application Priority Data

Dec. 13, 2006 (DE) .................. 10 2006 058 852

(51) Int. Cl.
G01S 13/08 (2006.01)
G01S 7/40 (2006.01)
G01F 23/00 (2006.01)
(52) U.S. Cl. .................. 342/124; 342/128; 342/145; 342/165; 342/174; 73/290 B; 702/55
(58) Field of Classification Search .................. 342/118, 342/124, 145, 165, 173, 174, 189, 196; 73/290 R, 73/290 B
See application file for complete search history.

(56) References Cited

U.S. PATENT DOCUMENTS

| | | | | |
|---|---|---|---|---|
| 4,503,433 A * | 3/1985 | Tomasi | .................. | 342/87 |
| 4,692,766 A * | 9/1987 | Rolfs et al. | .................. | 342/200 |
| 5,365,178 A * | 11/1994 | Van Der Pol | .................. | 324/644 |
| 5,387,918 A * | 2/1995 | Wiesbeck et al. | .................. | 342/128 |
| 5,440,310 A * | 8/1995 | Schreiner | .................. | 342/124 |
| 6,415,660 B1 * | 7/2002 | Sinz et al. | .................. | 73/290 R |
| 6,679,115 B2 * | 1/2004 | Heidecke | .................. | 73/290 V |
| 7,412,337 B2 * | 8/2008 | Michalski et al. | .................. | 702/55 |
| 2003/0151543 A1 | 8/2003 | Nakanishi et al. | | |

FOREIGN PATENT DOCUMENTS

| | | |
|---|---|---|
| DE | 19713967 | 10/1998 |
| EP | 0 887 658 | 12/1998 |
| EP | 1353194 | 12/2007 |
| WO | 92/18876 | 10/1992 |
| WO | 98/38525 | 9/1998 |
| WO | 2006035199 | 4/2006 |

* cited by examiner

*Primary Examiner*—Thomas H Tarcza
*Assistant Examiner*—Peter M Bythrow
(74) *Attorney, Agent, or Firm*—Fay Kaplun & Marcin, LLP (57) ABSTRACT

In fill-level measuring devices that operate according to the FMCW principle, nonlinearity of the sensor signal depending on the time can result in measuring inaccuracies. The fill-level measuring device that operates according to the FMCW principle comprises a correction unit for the mathematical correction of the amplitude values or for calculating points in time of scanning the amplitude values on the basis of a reference correlation determined at the factory. In this way intermediate-frequency values that are identical to those of an ideal sensor can be derived.

25 Claims, 7 Drawing Sheets

METHOD AND DEVICE FOR CORRECTING NON-IDEAL INTERMEDIATE-FREQUENCY SIGNALS IN DISTANCE SENSING DEVICE ACCORDING TO THE FMCW PRINCIPLE

REFERENCE TO RELATED APPLICATIONS

This application claims the benefit to DE Patent Application Ser. No. 10 2006 058 852.5 filed 13 Dec. 2006 and U.S. Provisional Patent Application Ser. No. 60/874,986 filed 13 Dec. 2006, the disclosure of which applications is hereby incorporated herein by reference.

FIELD OF THE INVENTION

The present invention relates to fill level measuring. In particular, the present invention relates to a fill-level measuring device that operates according to the frequency modulated continuous wave (FMCW) principle, to the use of such a fill-level measuring device for fill level measuring, and to a method for measuring a fill level with such a fill-level measuring device.

BACKGROUND INFORMATION

In fill-level measuring devices or fill level sensors that operate according to the FMCW method, a frequency-modulated signal is radiated, with the use of a transmitting/receiving unit, in the direction of the medium to be measured, is reflected by said medium, and is received back at the fill-level measuring device by way of the transmitting/receiving unit.

Depending on the required conditions of service, various carrier waves can be considered for use in the field of fill-level measuring technology. Apart from acoustic waves, all kinds of electromagnetic waves are of particular importance, wherein in particular the frequency ranges of optical waves and radar waves are of technical relevance.

FIG. 1 shows the technical implementation of a fill-level measuring device according to the FMCW method. The modulation device 1 generates a modulation signal, which in an ideal case rises in a linear manner over time, which modulation signal is transmitted to a voltage-controlled oscillator (VCO) 2. At the output of the VCO 2 in the idealised state a linearly frequency-modulated signal arises, which is transmitted by way of a transmitter/receiver filter circuit 5 to the antenna 6 and is radiated from said antenna in the direction of the medium 7 to be measured. The receive signal that has been delayed in time by the transit time to the feed material and back to the sensor is separated, in the transmitter/receiver filter circuit 5, from the transmit signal, and is fed to the mixer 8. Within the mixer 8 the receive signal is mixed with the transmit signal that is present at the same point in time and subsequently fed to an analog low-pass filtering device 9, which eliminates undesirable signal components. In this manner an intermediate-frequency signal (ZF) arises, whose frequency is proportional to the distance between the sensor and the feed material surface, which distance is to be measured.

For more precise analysis of the intermediate-frequency signal, said signal is digitalised by means of an analog/digital converter (A/D) and is conveyed to a microprocessor system (μP) for further evaluation. Within the microprocessor system (μP) specialised signal processing algorithms process the incoming data stream. Normally, the digitally read intermediate-frequency signal (ZF) is transferred by means of fast Fourier transformation (FFT) to the spectral region where precise determination and measuring of the frequency components caused by the feed material surface can be carried out. The distance value determined by the μP can be provided to a higher-order control device or measured-value display by means of a communication device (KE), not shown, for example by means of a 4 . . . 20 mA line.

In actually constructed FMCW systems the idealised conditions may at best be achieved by approximation. In this context generating a transmit signal whose frequency is to depend on the time in a linear manner may provide problems. According to the arrangement shown in FIG. 1, both the modulation device (MO) and the voltage-controlled oscillator (VCO) have a direct influence on the linearity of the transmit signal. The linearity of the modulation device may be ensured by comparatively simple technical measures. In contrast to this, the characteristic curve of the voltage-controlled oscillator (VCO), whose output frequency generally has no linear interrelationship with the control voltage, may be subject to a host of different influences, wherein in particular series scatter, operating temperature and ageing effect are to be taken into account.

The measuring errors resulting from this non-linearity may have a negative effect on the system sensitivity, measuring accuracy and selectivity between adjacent echoes, wherein the respective inaccuracies increase markedly as the distance from the fill level to be measured increases.

In order to compensate for the above-mentioned non-linearities and the associated measuring accuracies, various methods may be used.

In DE 19713967 a method for correcting the non-linearity of the voltage-controlled oscillator (VCO) is described. According to this method, the output frequency of the VCO is determined as a function of the particular modulation voltage that is present during the actual measuring in a suitable evaluation unit. Based on this characteristic curve, for the subsequent measuring cycle a gradient of the modulation voltage u that differs from the linear function is determined, which gradient is suitable to compensate for the non-linearity of the VCO such that at its output an ideal frequency gradient over time arises.

Furthermore, from EP 1353194 methods may be known which from measuring the width and the amplitude of an echo situated in the measuring region carry out a correction of the modulation voltage gradient. According to the invention, the modulation signal that is used for this is described in a form of a polynomial of order two. Adapting the modulation signal gradient takes place by changing the coefficients of this polynomial.

Furthermore, for correcting the non-linearity, methods are used that provide for a reference branch for the signal, which reference branch is integrated in the sensor. EP 0848829 proposes that by means of a SAW line element a defined echo be generated in the reference branch at a distance that is known in advance. The intermediate frequency generated in the reference branch is subject to the same inadequacies caused by the non-linearity of the frequency sweep as is the case with the measuring signal acquired in the measuring branch. If the measuring signal is scanned according to the method in relation to fixedly defined phase angles of the reference signal, the errors caused by the non-linearity may be eliminated, so that the digital form of the measuring signal becomes identical to that of an idealised system.

A further-reaching embodiment of a correction device combines the above-mentioned methods. In WO 98/38525, by means of a detector device, the period duration is continuously determined from the reference signal generated by a delay device, with the period duration being compared to the desired-period duration that is known in advance. From the resulting deviations, iteratively, a suitable modulation voltage gradient u(t) is determined, which in turn is used to drive the VCO. In the interaction of the correction device, the modulator and the VCO, a signal as would be expected in an idealised system arises in this way at the output of the VCO.

In various respects the correction methods presented so far may be associated with disadvantages.

For example, methods that aim at correcting the non-linearity of the VCO by providing a suitable non-linear modulation signal may either involve increased component expenditure if generating the correction signal is implemented by a separate hardware unit, or alternatively may involve an increased processor load during the actual measuring procedure. In view of the limited energy resources of modern two-conductor sensors the increased output requirements may have a particularly negative effect, especially during the period when the actual measuring takes place, in that a large part of the available energy needs to be used for generating the carrier wave that is necessary in this system.

Moreover, various concepts involve the design of a second reference branch that is used exclusively for internal calibration. Within the reference branch an artificial echo is generated by means of a delay element that has been defined beforehand. From a technical point of view, the delay times required are usually achieved with the use of integrated SAW components. Apart from the additional circuit expenditure in implementing the reference branch, these concepts are associated with disadvantages in particular due to the strong temperature dependency of the SAW component, which temperature dependency in turn needs to be corrected with the use of a temperature sensor.

Furthermore, measuring the width and the amplitude of the intermediate-frequency spectrum, as is proposed in EP 1353194, may be applicable due to the large number of echoes to be expected in the context of fill level measuring.

SUMMARY OF THE INVENTION

According to an exemplary embodiment of the present invention, a fill level measuring device is stated that operates according to the FMCW principle, wherein the fill-level measuring device comprises a storage unit for storing a first reference correlation, determined during a first reference phase of the fill-level measuring device, between a frequency radiated from the fill-level measuring device and the radiation time; an evaluation unit for determining a correlation, determined during an operating phase of the fill level measuring device, between amplitude values of an intermediate-frequency signal and the radiation time; and a correction unit for mathematically correcting the amplitude values or for calculating points in time of scanning the amplitude values on the basis of the first reference correlation.

In other words, scanning of the intermediate-frequency signal takes place, for example, at equidistant points in time, wherein the measuring curve of the real sensor, which measuring curve has been measured during the operating phase, is mathematically corrected. As an alternative, scanning does not take place at equidistant points in time but instead at adapted points in time of scanning that have been calculated beforehand so that in the digital domain it appears that the scanning values are constant.

In each case, correction of the measuring signal or of the points in time of scanning takes place on the basis of a reference signal, which has, for example been incorporated at the factory.

According to a further exemplary embodiment of the present invention, the mathematically corrected amplitude values correspond to the theoretical amplitude values of an ideal fill-level measuring device.

According to a further exemplary embodiment of the present invention, mathematical correction of the amplitude values involves interpolation. For example, the correction rule relates to the correlation, archived in the storage device, between the radiated frequency and the associated time. The intermediate-frequency values present in the storage device thus correspond to the signal amplitudes generated by an ideal sensor.

According to a further exemplary embodiment of the present invention, the actually present amplitude values are determined at equidistant points in time.

Only mathematical correction of the amplitude values may thus be necessary. The time stamp (i.e. the scanning time) does not have to be adapted.

According to a further exemplary embodiment of the present invention, mathematical correction involves an allocation of actually present amplitude values to predefined scanning points in time that have been defined beforehand.

According to a further exemplary embodiment of the present invention, scanning values of the amplitude, which scanning values are required but are not present, are obtained by means of interpolation.

According to a further exemplary embodiment of the present invention, the calculated points in time of scanning are archived in the storage unit during a calibration phase prior to the operating phase.

Thus the actual points in time of scanning are, for example, determined at the factory by carrying out and evaluating a test measurement. Generally speaking, the calculated points in time of scanning may then no longer be distributed so as to be equidistant.

According to a further exemplary embodiment of the present invention, the amplitude values relating to the calculated non-equidistant points in time of scanning are determined so that they correspond to the theoretical amplitude values of an ideal fill-level measuring device with equidistant scanning.

Scanning the measuring signal thus does not take place in equidistant steps, but instead at corrected calculated points in time so that any non-linear correlation between the radiation time and the frequency is compensated for.

According to a further exemplary embodiment of the present invention, the evaluation unit comprises an analog/digital converter for scanning the amplitude values of the intermediate-frequency signal.

Furthermore, according to a further exemplary embodiment of the present invention, the first reference correlation is determined at the factory by measuring the radiated frequency. The sensor may thus be ready for use right after delivery. No additional calibration step may be required.

According to a further exemplary embodiment of the present invention, the fill-level measuring device comprises an evaluation unit for evaluating an intermediate-frequency spectrum, wherein evaluation of the intermediate-frequency spectrum involves transfer of the intermediate-frequency signal to the frequency range with the use of fast Fourier transformation.

Furthermore, according to an exemplary embodiment of the present invention, the evaluation unit is designed to determine a second reference correlation between the frequency radiated by the fill-level measuring device and the radiation time during a second reference phase of the fill-level measuring device, wherein the second reference correlation replaces the first reference correlation in the storage device.

In this way the sensor may be recalibrated, for example in field operation.

According to a further exemplary embodiment of the present invention, the first reference correlation and the second reference correlation are determined at a predetermined time interval.

In this way the transmission characteristics may be regularly updated at determined points in time of calibration.

According to a further exemplary embodiment of the present invention, the second reference correlation is determined when a particular event occurs. Accordingly, recalibration of the sensor depends on external or internal factors of influence and is thus variable in time, as required.

According to a further exemplary embodiment of the present invention, the storage unit is designed to store a third reference correlation between a frequency radiated by the fill-level measuring device and a temperature.

Furthermore, a temperature sensor can be provided for measuring the temperature of an oscillator of the fill-level measuring device, which temperature is present at the point in time of transmission, wherein the mathematical correction or the calculation of the points in time of scanning the amplitude values takes place based on the temperature present at the oscillator, and based on the third reference correlation.

In other words, during manufacture at the factory, in addition, the influence of the temperature on the radiated transmission frequencies is stored. With the use of an additionally sensor-integrated probe the temperature of the voltage-controlled oscillator, which temperature is present at the point in time of transmission, can be acquired and in the subsequently to be carried out mathematical correction of the recorded signals can be taken into account by selection of the gradient of the transmission frequency over time, which gradient is associated with the respective temperature and is archived in the storage device.

According to a further exemplary embodiment of the present invention, the fill-level measuring device is a fill-level radar system.

According to a further exemplary embodiment of the present invention, the use of a fill-level measuring device for fill level measuring is stated.

Furthermore, a method for measuring a fill level with a fill-level measuring device is stated, in which method a first reference correlation, determined during a first reference phase of the fill-level measuring device, between a frequency radiated by the fill-level measuring device and the radiation time is determined; a correlation, determined during an operating phase of the fill-level measuring device, between amplitude values of an intermediate frequency signal and the radiation time is determined; and a mathematical correction of the amplitude values of the intermediate-frequency signal or a calculation of points in time of scanning the amplitude values of the intermediate-frequency signal is carried out on the basis of the first reference correlation.

In the sensor according to the invention, for example already during its manufacture at the factory, measuring of the radiated frequency over time is carried out, and the correlation is archived in a suitable form in a storage unit of the sensor. During the operating phase of the sensor the intermediate-frequency signal arising as a result of the mixer is scanned at equidistant points in time by means of an A/D converter and is archived in a suitable storage device. After completion of the reading procedure, mathematical correction of the archived amplitude values is carried out by means of a method according to the invention, wherein the correction rule uses the correlation between the radiated frequency and the associated time, which correlation is also archived in the storage device of the sensor. The intermediate-frequency values that after completion of the mathematical correction are present in the storage device are identical to the signal amplitudes generated by an ideal sensor. Subsequent evaluation of the intermediate-frequency spectrum takes place by means of algorithms, wherein usually transfer of the time signal to the frequency range is carried out with the use of a so-called fast Fourier transformation (FFT). Various methods can be employed for subsequent extraction of echoes and for identification of the echo associated with the fill level, wherein at this point, in particular, methods can also be used which, for example, have been developed for use within a pulse-distance sensing device.

In an alternative embodiment of the sensor according to the invention, further improvement of the method may be achieved by dynamic time-related tracking of the correlation, archived in the storage device, between the radiated frequency and the associated time. In this arrangement, updating of the transmission characteristics can take place at determined points in time of calibration that are equidistant in time. As an alternative it may also be possible to carry out recalibration of the sensor depending on external or internal factors of influence and thus in a manner that is variable in time.

A method and a fill-level measuring device are thus disclosed which may provide improved correction of the non-linearity in FMCW distance sensing devices. Moreover, the present invention relates to a method for processing intermediate-frequency signals as they can arise by any monotonously rising or monotonously falling gradient of the frequency of the radiated signal over time.

Below, exemplary embodiments of the present invention are described with reference to the figures.

DETAILED DESCRIPTION OF EXEMPLARY EMBODIMENTS

The illustrations in the figures are diagrammatic and not to scale.

In the following description of the figures the same reference characters are used for identical or similar elements.

Figure 1A:
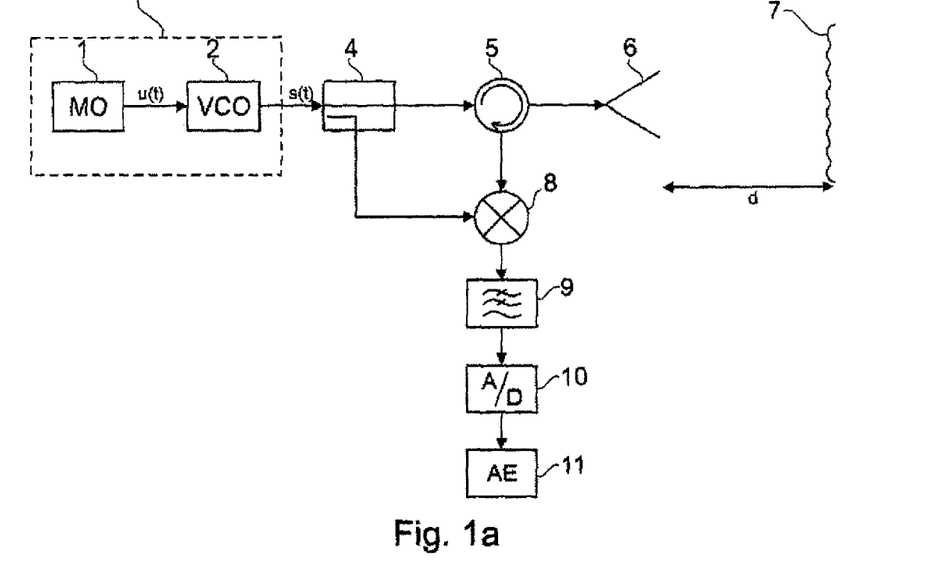
FIG. 1a shows a schematic diagram of a distance sensing device or fill level radar according to the FMCW method.

FIG. 1a shows a functional block diagram of a device for fill level measuring according to the FMCW method. The exemplary design of a microwave system comprises a modulation device 1 which drives a voltage controlled oscillator 2, in the embodiment shown a microwave oscillator. Depending on the modulation voltage, the oscillator generates a high-frequency frequency-modulated transmit signal at its output, which transmit signal, by way of a transmitter/receiver filter circuit 5 and by way of an antenna 6, is radiated in the direction of the feed material 7 to be measured and is reflected by said feed material 7. The reflected signal components are received back by way of the antenna 6 and are transmitted to a high-frequency mixer 8 by the transmitter/receiver filter circuit 5. In the high-frequency mixer the received signal is converted with part of the transmit signal that is present at the same time, which part is derived from the transmit signal path by means of a coupling device 4. The mixer signals that arise in this process are fed to a low-pass filtering device 9 that is responsible for eliminating undesired signal components. The intermediate-frequency signal (ZF) that is present at the output of the low-pass filter is scanned by means of an analog/digital converter 10 and is conveyed to an evaluation unit 11 for further processing.

Figure 1B:
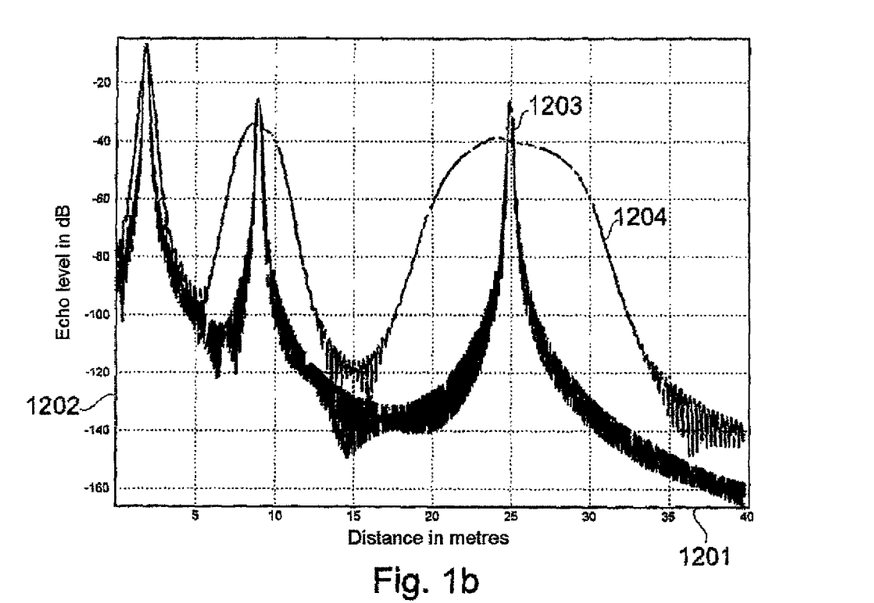
FIG. 1b shows the effect of a non-linear frequency sweep.

FIG. 1b shows a diagrammatic view of the effects of a non-linear frequency sweep without the use of the present invention. The horizontal axis 1201 represents the distance of the feed material in metres (from 0 m to 40 m), while the vertical axis 1202 represents the echo level in dB (of approximately −160 dB to −10 dB).

The curve 1203 represents the ideal spectrum, while the curve 1204 represents the spectrum disturbed by the non-linearity. Simulation is based on an FMCW radar system with a frequency sweep of between 23.5 GHz and 24.5 GHz whose sweep curve at 24 GHz deviates by 61 MHz from the ideal line. If the deviations are even more pronounced, the spatial resolution and the dynamics of the echo image may be disturbed more and more severely. Precise measuring of echoes may then becomes almost impossible.

Figure 2:
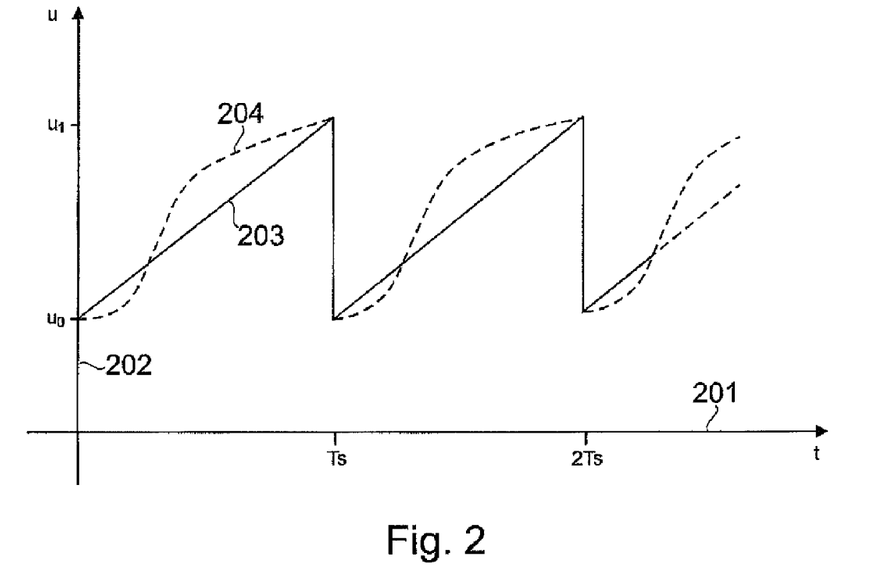
FIG. 2 shows suitable modulation signals of an FMCW measuring device according to an exemplary embodiment of the present invention.

FIG. 2 shows an example of the gradient of the modulation voltage u(t), which may, for example, be generated by charging a capacitor by means of a constant current source (solid line 203). The horizontal axis 201 shows the time t. The vertical axis 202 shows the modulation voltage u(t).

In this diagram the sawtooth-shaped modulation voltage 203 shows a gradient that rises in an absolutely linear manner during the modulation period. With correct application of the method according to the invention, other modulation signal gradients may also be possible. Due to the inherent characteristics of the method, only the strict monotony of the radiated frequency over time may have to be insured. Under the generally valid assumption of strict monotony of the characteristic curve 303 of the voltage-controlled oscillator (VCO) contained in the system, the only restriction may relate to the modulation voltage 203, which has to have a strictly monotonous voltage gradient over time within a measuring cycle and a resulting voltage gradient that differs from the inverse gradient of the characteristic curve of the VCO. The dotted line 204 in FIG. 2 shows the example of a freely selected modulation signal that is nevertheless suitable according to the method according to the invention.

Below, the signal u(t) generated by the modulation device is used for driving the voltage-controlled oscillator.

Figure 3:
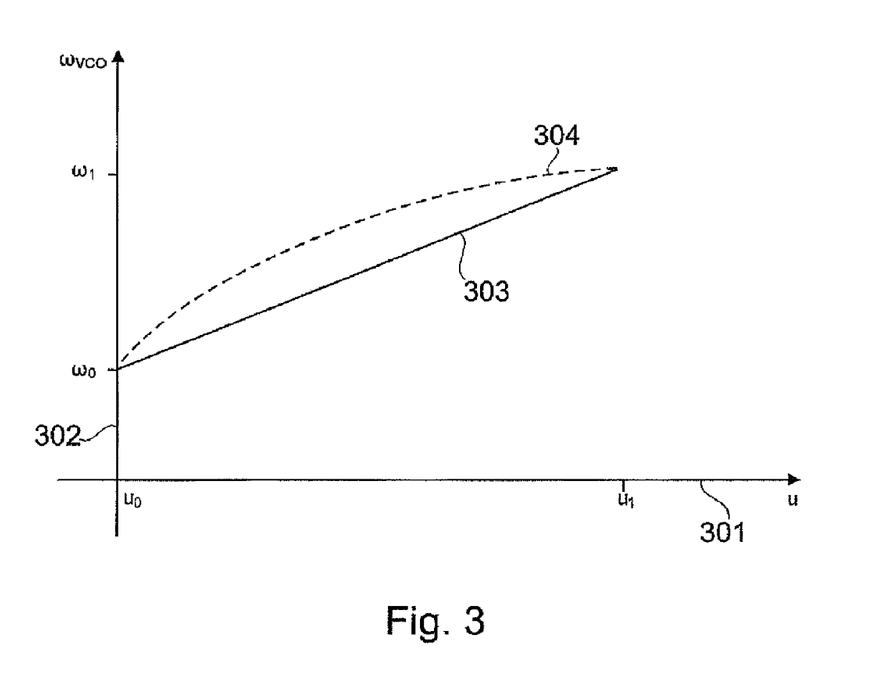
FIG. 3 shows a frequency characteristic of ideal and real voltage-controlled oscillators.

FIG. 3 shows the characteristic curve 303 of an ideally constructed VCO, which characteristic curve 303 is in a direct linear correlation to the drive voltage. The horizontal axis 301 represents the voltage. The vertical axis 302 represents the radian frequency.

Depending on the internal structure and on external influences (for example temperature fluctuations) actually constructed voltage-controlled oscillators may deviate considerably from the linear characteristic curve of the idealised component. The dashed line 304 in FIG. 3 shows the typical gradient of the characteristic curve of a real component, wherein it should be noted that the curve shown can additionally change depending on the operating temperature and the age of the VCO.

Below, the modulator and the VCO are taken together to form a single unit. The transmit signal generated by the signal source 3 in FIG. 1 is formed by interlinking the characteristic curves in FIGS. 2 and 3. The characteristic curve of the transmit device of the idealised sensor results from linking the modulation signal of FIG. 2, which modulation signal rises in a linear manner, with the linear characteristic curve of FIG. 3.

Figure 4:
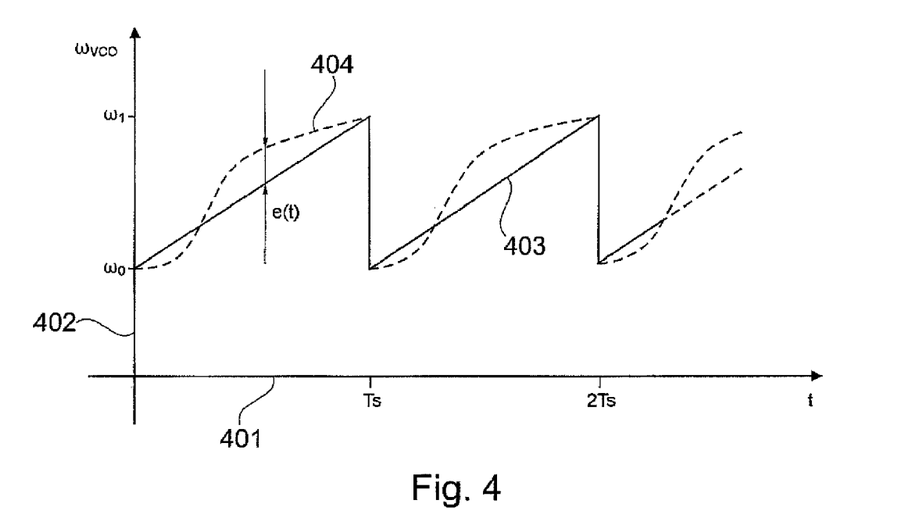
FIG. 4 shows an ideal and a real gradient of the radiated frequency of an FMCW measuring device over time.

FIG. 4 shows the resulting gradient of the transmit frequency over time. Within the base interval the frequency gradient can be described by:

$$\omega_{ideal}(t) = \mu \cdot t + \omega_0$$

wherein μ designates the sweep rate of the ideal sensor, which sweep rate depends on the sweep time $T_S$, on the transmission frequency $f_0$, at the beginning of a sweep and on the transmission frequency $f_1$ at the end of a sweep according to the following correlation:

$$\mu = 2\pi \cdot \frac{f_1 - f_0}{T_S}$$

FIG. 4 shows in a dashed line 404 an example of the gradient of the resulting transmission frequency of an actually constructed FMCW system over time. The horizontal axis 401 represents the sweep time t; the vertical axis 402 represents the radian frequency.

The deviations between the transmission frequency and the ideal gradient 403 arise on the one hand as a result of deviations from the linear gradient when generating the drive signal in the modulator (compare non-ideal drive function in FIG. 2), and on the other hand as a result of the non-linear characteristic curve of an actually constructed voltage-controlled oscillator (FIG. 3). Mathematically the gradient of the transmission frequency of the real FMCW system can be derived by defining an error function e(t) from the gradient of the transmission frequency of the ideal system. The following correlation applies, wherein the error function (e) t is generally not known:

$$\omega_{real}(t) = \omega_{ideal}(t) + e(t)$$

The following discussion relating to the application of a sensor according to the invention relates to a measuring position comprising a single reflector. However, in principle the described correlations may also be transposed to systems comprising several reflection positions.

The non-ideal transmit signal 404 is radiated, by way of the antenna, in the direction of the medium to be measured, and is reflected back to the sensor by this medium. The signal transit time τ required for this is derived from the propagation speed c of the carrier wave and the distance a to be measured by:

$$\tau = \frac{2a}{c}$$

The delayed signal is converted in the sensor by means of a mixer. After low-pass filtering an intermediate frequency signal that depends on the delay time τ results, with the amplitude gradient of said intermediate-frequency signal being describable by approximation:

$$s_{ZF}(t) = A \cdot \cos\left(\mu\tau t + \left(\omega_0\tau - \frac{1}{2}\mu\tau^2\right) + \tau \cdot e(t)\right)$$

A denotes the maximum amplitude of the intermediate-frequency signal, which amplitude depends on the application conditions and the sensor design.

Figure 5:
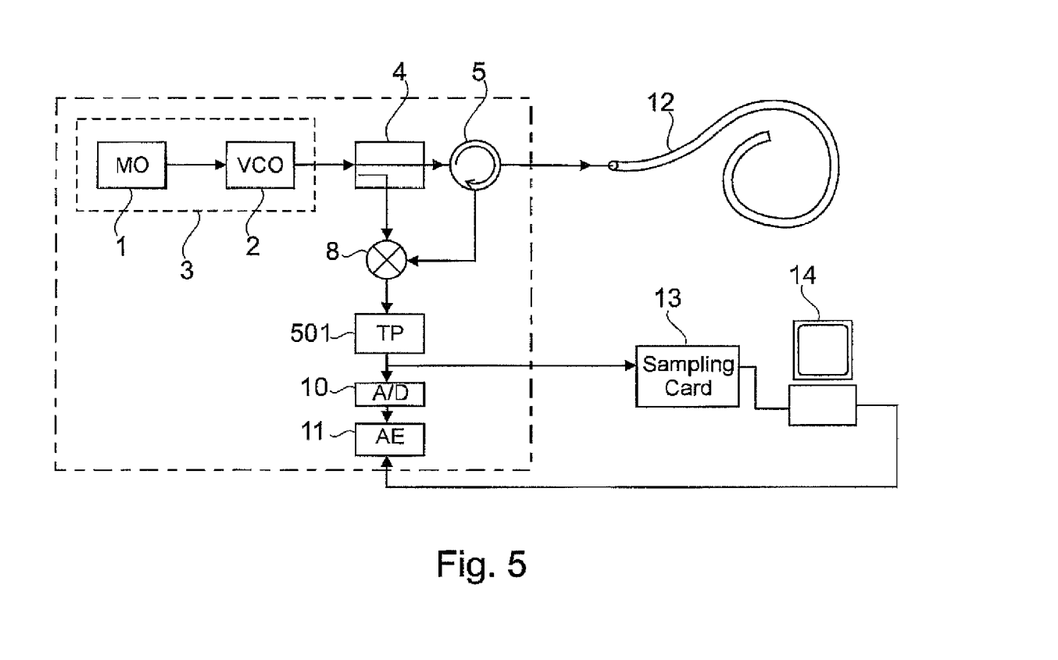
FIG. 5 shows an FMCW measuring device and a calibration device according to an exemplary embodiment of the present invention.

In the sensor according to an exemplary embodiment of the invention the gradient of the radiated frequency over time in the context of a calibration process is already acquired at the factory. For this purpose, first a measuring arrangement according to FIG. 5 is used. During calibration the antenna of the sensor is preferably replaced by a coaxial line 12 that is selected so as to be as long as possible, which coaxial line comprises a short circuit at its end. The signal generated by the transmitting device passes through the coaxial line 12, is reflected at its end, and is converted in the sensor by means of the mixer diode 8. A low-pass filter 501 arranged downstream removes any undesirable mixing components. Due to the extended signal delay times within the coaxial line 12, the resulting intermediate frequency essentially contains only higher frequencies, which are digitalised by means of a sampling card 13 according to prior art and by means of a commercially available PC system 14.

Figure 6A:
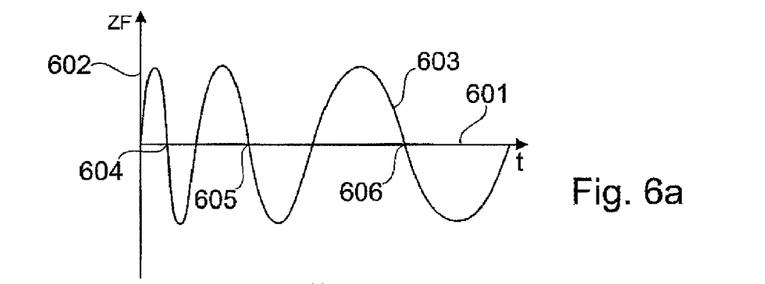
FIGS. 6a, 6b, 6c show method-related steps for determining the frequency characteristic when calibrating an FMCW measuring device according to an exemplary embodiment of the present invention.
Figure 6B:
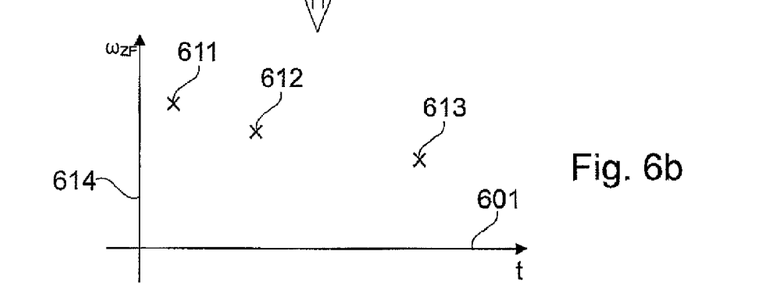

Within the PC system 14, the zero-crossing points in time 604, 605, 606 (see FIG. 6a) of the intermediate-frequency signal 603 are acquired and the resulting radian frequency values 611, 612, 613 are determined, which subsequently are allocated to the points in time between the respectively adjacent zero-crossing points in time 604, 605, 606 (see FIGS. 6a, 6b). The horizontal axes 601 represent the time; the vertical axis 602 represents the amplitude of the intermediate-frequency signal (see FIG. 6a); the vertical axis 614 represents the intermediate frequency (see FIGS. 6b, 6c); and the vertical axis 617 represents the transmitted frequency (see FIG. 6d).

Figure 6C:
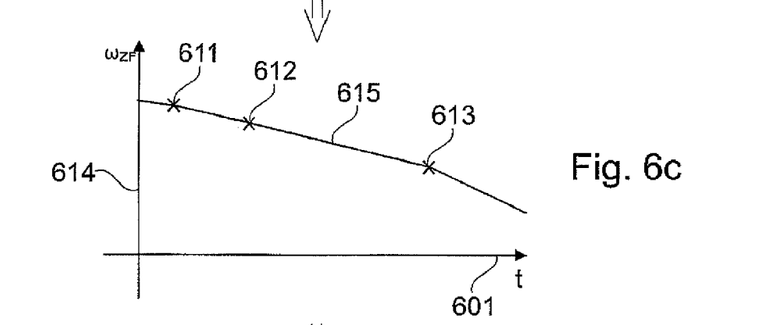
Figure 6D:
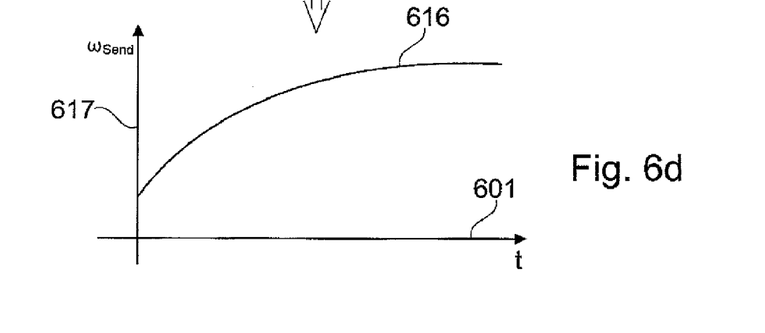

By means of numerical approximation methods, for example a least squares approximation, in the computer an adequate number of intermediate points are calculated on the basis of the measured points (compare curve 615 of FIG. 6c). Subsequently the finely resolved gradient of the radian frequency over time is numerically integrated and is divided by the signal delay time $$\tau = \frac{2 \cdot l_{coaxial\ line}}{c}$$

that can be calculated from the length of the coaxial line $l_{coaxial\ line}$. Finally, the initial radian frequency $\omega_0$, which has been determined from stationary measuring, is added to the integration result, from which the gradient of the transmitted frequency over time results (compare curve 616 of FIG. 6d). The PC archives the determined frequency gradient in the evaluation unit of the sensor.

During the actual operating phase of the sensor, in the first phase the process is unchanged when compared to that of prior art. The signal generated by the signal source is radiated by way of the antenna; is reflected by the medium to be measured; is mixed in the sensor with the use of the transmit signal generated at the then present point in time; and by means of an analog/digital converter is made available to an evaluation unit. Within the evaluation unit in a further step the archived amplitude values are given an associated time stamp which describes the point in time of scanning that belongs to the respective scanning value.

According to a first embodiment variant of the invention, in an evaluation step according to the invention, which evaluation step is carried out prior to the frequency analysis, the time stamps of the archived amplitude values are changed.

Figure 7:
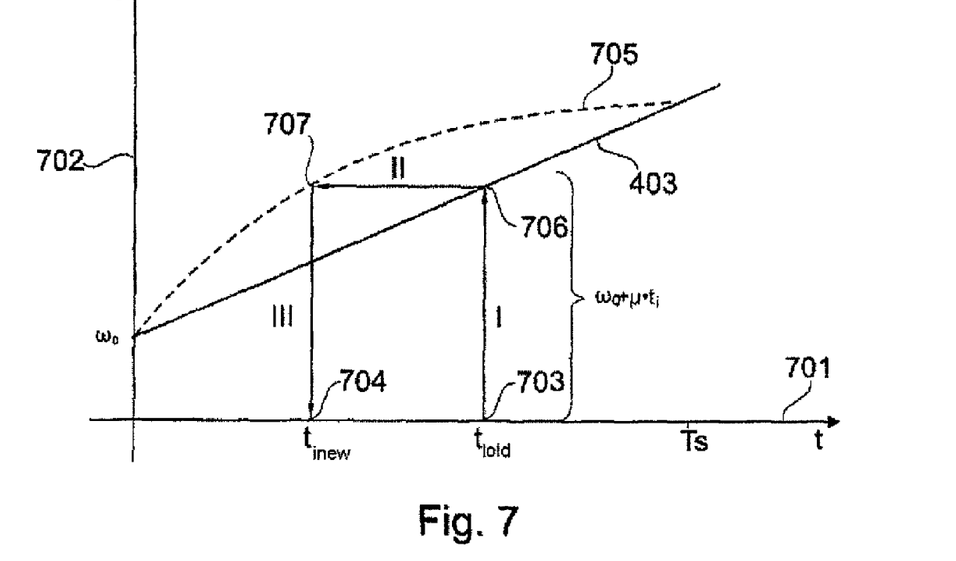
FIG. 7 shows the determination of the modified time-stamp values according to an exemplary embodiment of the present invention.

FIG. 7 illustrates the method of changing the time stamp, which method has to be applied in relation to each archived value. The horizontal axis 701 represents the time; the vertical axis 702 represents the frequency of the signal.

Starting from the actually entered time stamp value $t_{i,alt}$ 703 the transmission frequency that belongs to this point in time and that has been generated by a signal source that operates ideally in a linear manner is calculated according to the following equation:

$$\omega_{ideal}(t) = \omega_0 + \mu \cdot t$$

Based on the determined ideal frequency value 706, that point in time $t_{i,neu}$ 704 is sought, at which the actually transmitted frequency 705 generated by the device exactly corresponded to this value 707. This determination is based on the gradient, archived in the storage device, of the actually transmitted frequency 705. The time stamp entry $t_{i,alt}$ 703 of the actual amplitude value is then replaced by the determined point in time $t_{i,alt}$ 704.

Upon completion of the time stamp correction, generally speaking, the evaluation unit contains scanning values of the intermediate-frequency signal that are no longer distributed so as to be equidistant in time. In principle, direct frequency analysis of this signal is now possible. Since established methods of digital frequency analysis are generally based on values of the signal to be examined that are distributed so as to be equidistant in time, correction of the time stamps is followed by interpolation of the scanning values.

To this effect, in a further advantageous method-related step, a scanning screen that is equidistantly distributed in time is defined, based on the scanning frequency of the analog/digital converter. Within a calculation based thereon, the amplitude values associated with the equidistantly distributed points in time of scanning are determined. The method applied in this process, on the basis of the amplitude values comprising the corrected time stamp, interpolates the amplitude value belonging to the required point in time. Depending on the available calculation capacity, methods from the fields of allocation of the nearest neighbour, linear interpolation, polynomial interpolation, spline interpolation or some other interpolation methods can be used for this method-related step. On completion of calculation the equidistantly distributed signal comprises the scanning values as they would arise by analog/digital conversion within an ideal FMCW measuring device. The subsequent frequency analysis and evaluation of the echo signals can be carried out according to known methods in line with the state of the art.

In a further variation of the method according to the invention, the time stamps that are not distributed in an equidistant manner are calculated already during calibration at the factory and by means of a constant are archived in the storage device, so as to be fixed, instead of the determined gradient of the transmission frequency. This variant is, in particular, suitable for sensors having a scanning frequency that is set so as to be fixed for life. It is advantageous at this point that there is no longer any need to carry out the process step of time stamp correction in the sensor.

Figure 8:
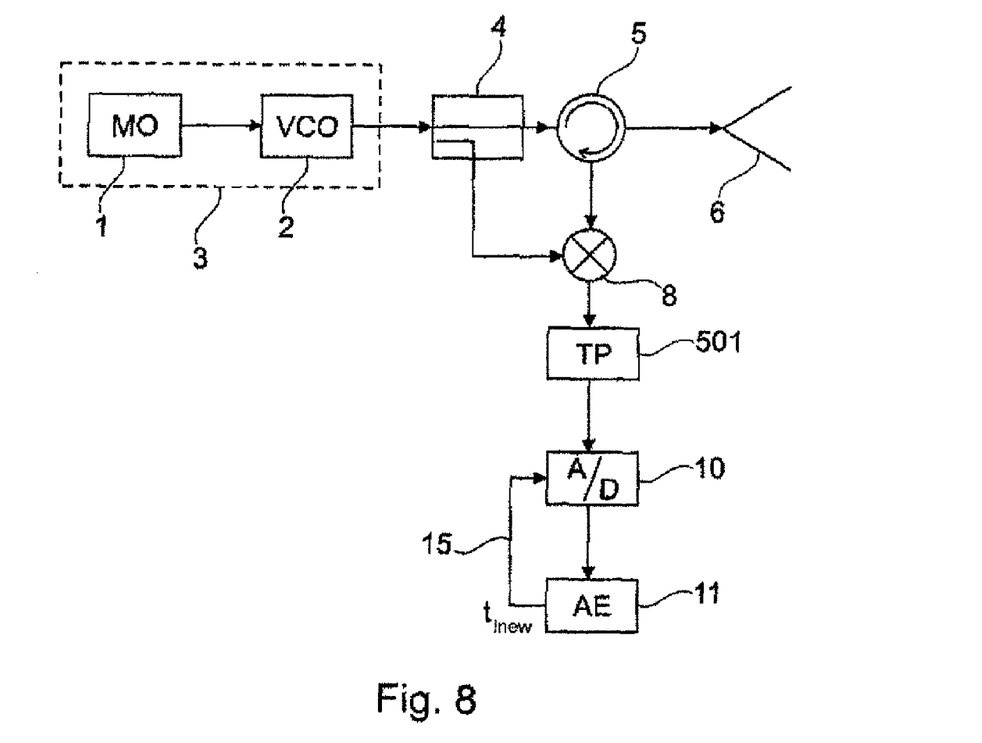
FIG. 8 shows a device with non-synchronous selection of the analog/digital converter according to an exemplary embodiment of the present invention.

Provided the time stamps have been archived in a fixed manner already during calibration, in a further variation of a sensor according to the invention it is possible to use a design according to FIG. 8. The main difference when compared to the device used up to now consists of the direct driving 15 of the analog/digital converter 10 by the evaluation unit 11. According to a further advantageous embodiment variant, the scanning points in time are not set so as to be equidistant, but instead they are defined by the corrected time stamps that are archived in the storage device. The signal read to the storage device by this non-equidistant scanning directly corresponds to the signal read-in by an ideal sensor and can be conveyed to the already mentioned methods of frequency analysis and echo evaluation without any further calculation steps. This embodiment variant provides special advantages in that interpolation for restoring the equidistance of the scanning values is no longer necessary.

Figure 9:
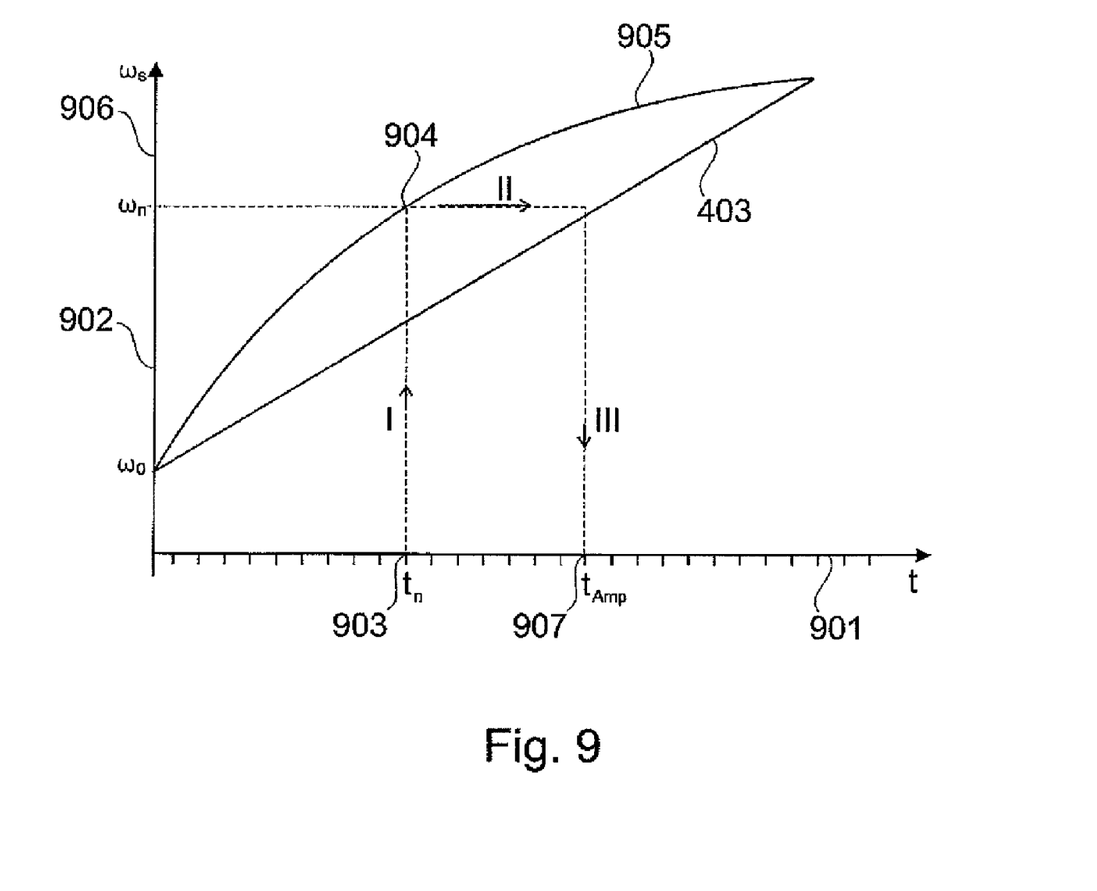
FIG. 9 shows the allocation of modified amplitude values according to an exemplary embodiment of the present invention.

According to a second embodiment variant of the invention, in a correction step according to the invention, which correction step takes place prior to frequency analysis, the amplitude values archived in the evaluation unit are directly extracted, by the method described below, from the non-ideal amplitude values that are present in the sensor. FIG. 9 illustrates the method used to this effect, which method is individually implemented in relation to each scanning value required by the evaluation unit. The horizontal axis 901 denotes the time; the vertical axis 902 denotes the frequency.

Starting with a time stamp $t_n$ 903, which represents a scanning value required by the evaluation unit, with the use of the frequency characteristic 905 that is archived in the storage device, the frequency $\omega_n$ 906 that is present at the required point in time of scanning is determined, which frequency has in reality been radiated. Subsequently, starting with this frequency, the point in time $t_{Amp}$ 907 is determined, at which the signal amplitude that belongs to the required time stamp $t_n$ has in reality been acquired by the analog/digital converter. The point in time of ideal amplitude is calculated based on the following equation:

$$t_{Amp} = \frac{\omega_n - \omega_0}{\mu}$$

Finally, the non-ideal signal archived in the storage device is searched in order to extract the amplitude value that was present at the point in time $t_{Amp}$ 907. The determined amplitude value is entered in the corrected intermediate-frequency vector instead of the nth scanning value.

Generally speaking, the amplitude at the point in time $t_{Amp}$ is not exactly described by any of the time stamp-amplitude pairs archived in the storage device. Based on the time stamps and amplitude values present, for this reason, generally speaking, an intermediate amplitude value relating to the point in time $t_{Amp}$ is calculated by means of suitable interpolation methods. Depending on the available calculation capacity, for this step, methods from the fields of allocation of the nearest neighbour, linear interpolation, polynomial interpolation, spline interpolation or other interpolation methods can be used. After completion of correction of the amplitude values, in the described second embodiment variant, too, amplitude values are ready for further evaluation, as would arise with the use of an ideal FMCW measuring device. Further evaluation of the signals can thus be carried out according to the known state of the art.

Figure 10:
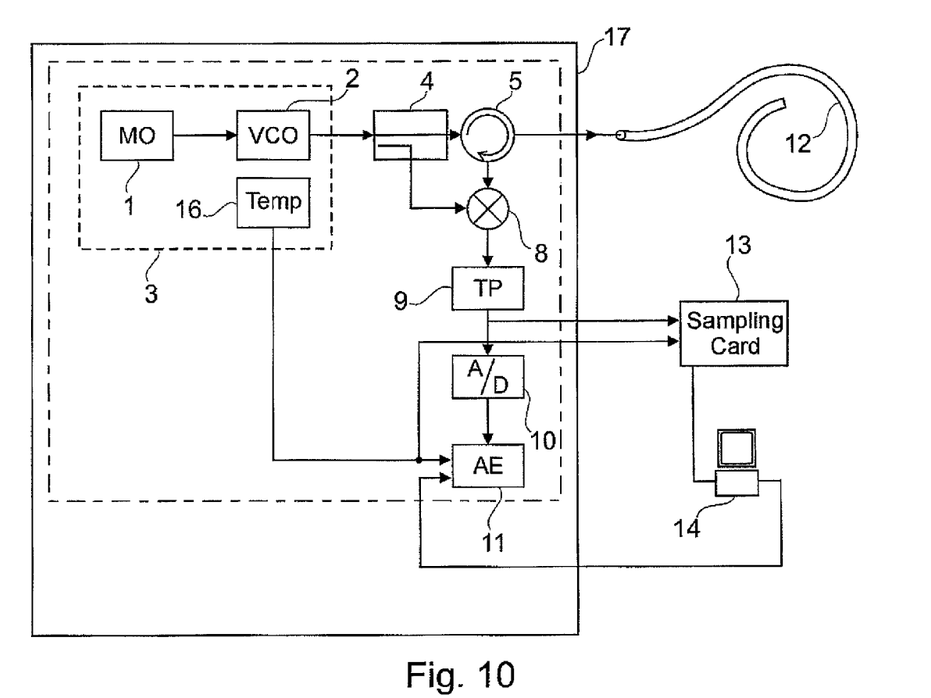
FIG. 10 shows a modified sensor and an associated calibration device when taking into account the temperature according to an exemplary embodiment of the present invention.

The device for distance sensing as shown in FIG. 10 differs from the variant shown in FIG. 1 by the additional incorporation of a temperature sensor 16 in the region of the voltage-controlled oscillator. The sensor shown makes it possible to carry out enhanced compensation also relating to the temperature-influenced changes in the characteristic curve of the VCO.

FIG. 10 also shows a calibration device suitable for use in conjunction with the proposed variant. The design shown is similar to that of the calibration device from FIG. 5, but it differs in that the VCO temperature determined by the built-in temperature sensor 16 is read-in by the PC by means of an A/D converter card. During the calibration process the sensor itself is in a temperature cabinet 17 whose temperature is also controlled by the external PC. Calibration of the sensor itself now takes place according to the explanations relating to FIG. 5, except that it takes place in relation to various temperatures that are to be defined in advance. In line with the embodiment variants presented it is now possible either to store in the sensor the gradient of the radiated signal frequency for each temperature, or to archive the time stamps associated with the respective temperatures in a fixed manner in the storage device of the sensor by means of a constant.

During the operating phase of the sensor the temperature of the VCO is continuously measured by means of the temperature sensor 16 shown in FIG. 10, with the temperature of the VCO being taken into account in the compensation for non-linearity. If the operating temperature measured does not tally with any temperatures measured during calibration at the factory, depending on the embodiment of the method, either the gradient of the frequency characteristic or the time values archived in the time stamps can be interpolated by being offset against the values of adjacent temperatures in relation to which calibration data has been determined.

Of course, for taking into account the temperature, the method shown may also be combined in conjunction with non-equidistant scanning of the intermediate-frequency signal according to FIG. 8.

Figure 11:
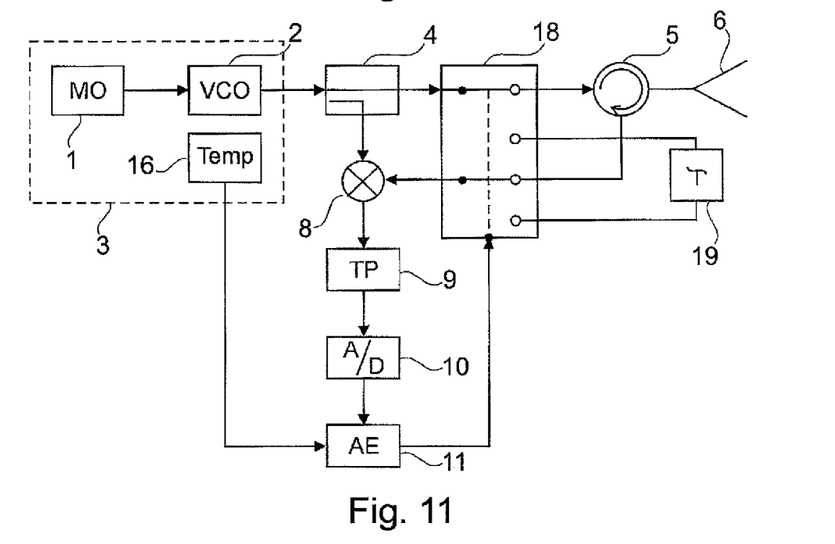
FIG. 11 shows a sensor with a recalibration device according to an exemplary embodiment of the present invention.

Apart from the non-linearity causes shown so far, an expanded version of the device according to an exemplary embodiment of the invention may additionally take into account the ageing effect of the components used. For this purpose a device according to FIG. 11 is may be used. Starting from an optional initial calibration at the factory, as described, the modified device may make it possible to acquire the frequency characteristics of the signal source during the transit time of the sensor at regular intervals, and to update said frequency characteristics.

To this effect, during a recalibration process that is to be carried out separately, the high-frequency signal generated by the signal source is fed through a suitable switch 18 to a reference route 19 integrated in the sensor, which reference route generates a defined echo. The reference route within the sensor may be implemented in the form of a SAW component, a coaxial line, or other delay elements. During the calibration cycle, the evaluation unit incorporated in the sensor, which evaluation unit is to be expanded by a suitable calibration block, has to take over the steps, which were originally carried out in the calibration device at the factory, for determining the radiated frequency over time. The result of calibration is finally archived in the storage device of the evaluation unit, and in the subsequent measuring cycles is used for correcting the non-linearity of the signal source.

The described implementation of a recalibration device represents an exemplary embodiment of the method. Of course, any methods that are available according to the state of the art may be used for acquiring the radiated frequency over time in alternative implementations.

The described recalibration of the sensor may be initiated according to various aspects. Concepts that suggest themselves provide for recalibration after a time interval that has been defined in advance, so that the ageing effect of the components can be taken into account accordingly. Moreover, further-reaching alternatives provide for recalibration cycles that are flexible in time, which are, for example, started at any change in the temperature of the voltage-controlled oscillator.

In an alternative approach it may furthermore be possible not to acquire the gradient of the radiated frequency within calibration carried out at the factory, but instead to carry out this task at the time of starting up the sensor during initialisation, with the use of one of the above-described recalibration devices.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

What is claimed is:

1. A fill-level measuring device that operates according to a frequency modulated continuous wave (FMCW) principle, comprising:
    a storage unit storing a first reference correlation, the first reference correlation being determined during a first reference phase of the fill-level measuring device, between a frequency radiated from the fill-level measuring device and a radiation time;
    an evaluation unit determining a correlation, the correlation being determined during an operating phase of the fill-level measuring device, between amplitude values of an intermediate-frequency signal and the radiation time; and
    a correction unit;
    wherein the correction unit performs one of (a) correcting the amplitude values,
    wherein the intermediate frequency signal is scanned at equidistant points in time and wherein the amplitude values of the intermediate-frequency signal of the real sensor determined during the operating phase of the fill-level measuring device are mathematically corrected so that a resulting digital signal equals a signal from an ideal FMCW system and (b) calculating points in time for sampling the amplitude values based on the first reference correlation, wherein the intermediate-frequency signal is scanned at calculated, adapted points in time so that a resulting digital signal equals a signal resulting from an ideal FMCW system.

2. The fill-level measuring device according to claim 1, wherein the mathematically corrected amplitude values correspond to theoretical amplitude values of an ideal fill-level measuring device.

3. The fill-level measuring device according to claim 1, wherein mathematical correction of the amplitude values involves interpolation.

4. The fill-level measuring device according to claim 1, wherein the actually present amplitude values are determined at equidistant points in time.

5. The fill-level measuring device according to claim 1, wherein the mathematical correction involves an allocation of actually present amplitude values to predefined scanning points in time.

6. The fill-level measuring device according to claim 5, wherein scanning values of the amplitude, which scanning values are required but are not present, are obtained using interpolation.

7. The fill-level measuring device according to claim 1, wherein the calculated points in time of scanning are archived in the storage unit during a calibration phase prior to the operating phase.

8. The fill-level measuring device according to claim 1, wherein the amplitude values relating to the calculated non-equidistant points in time of scanning are determined so that they correspond to the theoretical amplitude values of an ideal fill-level measuring device with equidistant scanning.

9. The fill-level measuring device according to claim 1, wherein the evaluation unit comprises an analog/digital converter which scans the amplitude values of the intermediate-frequency signal.

10. The fill-level measuring device according to claim 1, wherein the first reference correlation is determined at a factory by measuring the radiated frequency.

11. The fill-level measuring device according to claim 1, further comprising:
    a further evaluation unit evaluating an intermediate-frequency spectrum,
    wherein evaluation of the intermediate-frequency spectrum involves transfer of the intermediate-frequency signal from the time domain to the frequency domain with the use of Fast Fourier Transformation.

12. The fill-level measuring device according to claim 11, wherein the further evaluation unit determines a second reference correlation between the frequency radiated by the fill-level measuring device and the radiation time during a second reference phase of the fill-level measuring device and wherein the second reference correlation replaces the first reference correlation in the storage device.

13. The fill-level measuring device according to claim 12, wherein the first reference correlation and the second reference correlation are determined at a predetermined time interval.

14. The fill-level measuring device according to claim 12, wherein the second reference correlation is determined when a particular event occurs.

15. The fill-level measuring device according to claim 1, wherein the storage unit stores a third reference correlation between a frequency radiated by the fill-level measuring device and a temperature.

16. The fill-level measuring device according to claim 15, further comprising:
an oscillator; and
a temperature sensor measuring a temperature of the oscillator, which temperature is present at the point in time of transmission,
wherein one of (a) the mathematical correction and (b) the calculation of the points in time of scanning the amplitude values takes place as function of the temperature present at the oscillator and the third reference correlation.

17. The fill-level measuring device according to claim 1, wherein the fill-level measuring device is a fill-level radar system.

18. The use of a fill-level measuring device for fill level measuring, the fill-level measuring device includes (1) a storage unit storing a first reference correlation, the first reference correlation being determined during a first reference phase of the fill-level measuring device, between a frequency radiated from the fill-level measuring device and a radiation time; (2) an evaluation unit determining a correlation, the correlation being determined during an operating phase of the fill-level measuring device, between amplitude values of an intermediate-frequency signal and the radiation time; and (3) a correction unit; wherein the correction unit performs one of (a) correcting the amplitude values, wherein the intermediate frequency signal is scanned at equidistant points in time and wherein the amplitude values of the intermediate-frequency signal determined during the operating phase of the fill-level measuring device are mathematically corrected so that a resulting digital signal equals a signal from an ideal FMCW system and (b) calculating points in time for sampling the amplitude values based on the first reference correlation, wherein the intermediate-frequency signal is scanned at calculated, adapted points in time so that a resulting digital signal equals a signal resulting from an ideal FMCW system.

19. A method for measuring a fill level using a fill-level measuring device, comprising the steps of
storing a first reference correlation, the first reference correlation being determined during a first reference phase of the fill-level measuring device, between a frequency radiated by the fill-level measuring device and the radiation time;
determining a correlation, the correlation being determined during an operating phase of the fill-level measuring device, between amplitude values of an intermediate frequency signal and the radiation time;
performing one of (a) a mathematical correction of the amplitude values and (b) a calculation of points in time of scanning the amplitude values as a function of the first reference correlation; and
performing one of (a) during the mathematical correction of the amplitude values, the intermediate-frequency signal is scanned at equidistant points in time and the amplitude values of the intermediate-frequency signal are determined during the operating phase of the fill-level measuring device by mathematical correction and (b) during calculation of points in time scanning the amplitude values based on the first reference correlation, scanning the intermediate-frequency signal at calculated, adapted points in time so that a resulting digital signal equals a signal of an ideal FMCW system.

20. The method according to claim 19, wherein the amplitude values are determined at equidistant points in time.

21. The method according to claim 19, further comprising the step of
determining the first reference correlation at a factory by measuring the radiated frequency.

22. The method according to claim 19, further comprising the step of
determining a second reference correlation between the frequency radiated by the fill-level measuring device and the radiation time during a second reference phase of the fill-level measuring device,
wherein the second reference correlation replaces the first reference correlation in the storage device.

23. The method according to claim 19, further comprising the step of:
measuring the temperature of an oscillator of the fill-level measuring device, which temperature is present at the point in time of transmission; and
storing a third reference correlation between the frequency radiated by the fill-level measuring device and the temperature,
wherein the mathematical correction is determined as a function of (a) the temperature present at the oscillator and (b) the third reference correlation.

24. A fill-level measuring device that operates according to the frequency modulated continuous wave (FMCW) principle, wherein the fill-level measuring device comprises:
a storage unit for storing a first reference correlation, the first reference correlation being determined during a first reference phase of the fill-level measuring device, between a frequency radiated from the fill-level measuring device and a radiation time,
an evaluation unit for determining a correlation, the correlation being determined during an operating phase of the fill-level measuring device, between amplitude values of an intermediate-frequency signal and the radiation time;
a correction unit;
wherein the correction unit performs one of (a) mathematically correcting the amplitude values, wherein the intermediate-frequency signal is scanned at equidistant points in time and wherein the amplitude values of the intermediate-frequency signal, determined during the operating phase of the fill-level measuring device, are mathematically corrected and (b) calculating points in time of scanning the amplitude values based on the first reference correlation, wherein the intermediate-frequency signal is scanned at calculated, adapted points in time so that in a digital domain it appears that scanning values resulting from the scanning are constant.

25. A method for measuring a fill level by means of a fill-level measuring device, with the method comprising the steps of:
storing a first reference correlation, the first reference correlation being determined during a first reference phase of the fill-level measuring device, between a frequency radiated by the fill-level measuring device and the radiation time;
determining a correlation, the correlation being determined during an operating phase of the fill-level measuring device, between amplitude values of an intermediate frequency signal and the radiation time;
performing one of (a) a mathematical correction of the amplitude values and (b) a calculation of points in time of scanning the amplitude values as a function of the first reference correlation; and
performing one of (a) during the mathematical correction of the amplitude values, scanning the intermediate-frequency signal at equidistant points in time and mathematically correcting the amplitude values of the intermediate-frequency signal determined during the operating phase of the fill-level measuring device; and (b) during the calculation of points in time of scanning the amplitude values based on the first reference correlation, scanning the signal at calculated, adapted points in time so that, in a digital domain, it appears that scanning values resulting from the scanning are constant.

* * * * *